(12) United States Patent
Puckett et al.

(10) Patent No.: US 10,855,372 B1
(45) Date of Patent: Dec. 1, 2020

(54) SYSTEMS AND METHODS FOR REDUCTION OF OPTICAL SIGNAL LINE WIDTH

(71) Applicant: Honeywell International Inc., Morris Plains, NJ (US)

(72) Inventors: Matthew Wade Puckett, Phoenix, AZ (US); Jianfeng Wu, Tucson, AZ (US); Neil A. Krueger, Saint Paul, MN (US); Karl D. Nelson, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/654,897

(22) Filed: Oct. 16, 2019

(51) Int. Cl.
| G02B 6/10 | (2006.01) |
| H04B 10/2537 | (2013.01) |
| H01S 3/067 | (2006.01) |
| G02B 6/02 | (2006.01) |
| H01S 3/30 | (2006.01) |

(52) U.S. Cl.
CPC ..... *H04B 10/2537* (2013.01); *G02B 6/02076* (2013.01); *H01S 3/0675* (2013.01); *H01S 3/302* (2013.01)

(58) Field of Classification Search
CPC combination set(s) only.
See application file for complete search history.

(56) References Cited

U.S. PATENT DOCUMENTS

| 4,159,178 A | 6/1979 | Vali et al. |
| 4,396,290 A | 8/1983 | Morris |
| 4,863,272 A | 9/1989 | Coccoli |
| 4,922,481 A | 5/1990 | Hicks |
| 4,952,059 A | 8/1990 | Desurvire et al. |
| 5,064,288 A | 11/1991 | Dyes et al. |
| 5,323,415 A | 6/1994 | Quast et al. |
| 5,351,252 A | 9/1994 | Toyama et al. |
| 5,406,370 A | 4/1995 | Huang et al. |
| 5,408,317 A | 4/1995 | Dyes et al. |
| 5,517,305 A | 5/1996 | Raab |
| 5,537,671 A | 7/1996 | Toyama et al. |
| 5,912,910 A | 6/1999 | Sanders et al. |

(Continued)

FOREIGN PATENT DOCUMENTS

| EP | 2685213 A2 | 1/2014 |
| EP | 2927636 A1 | 10/2015 |

(Continued)

OTHER PUBLICATIONS

Abd-Rahman et al., "Multiwavelength, bidirectional operation of twin-cavity Brillouin/erbium fiber laser", "Optics Communications 181", Jul. 1, 2000, pp. 135-139, Publisher: Elsevier Science B.V.

(Continued)

*Primary Examiner* — Eric Wong
(74) *Attorney, Agent, or Firm* — Fogg & Powers LLC (57) ABSTRACT

Coupled resonators having two resonances are described. A first resonance occurs at the frequency of a pump signal. A second resonance occurs at the frequency of a first Stokes signal. The stop band of the coupled resonators suppresses the second Stokes signal and thus all other higher order Stokes signals. The coupled resonators can be used to more efficiently generate a first Stokes signal having a narrow line width signal.

20 Claims, 9 Drawing Sheets

(56) References Cited

U.S. PATENT DOCUMENTS

| | | |
|---|---|---|
| 6,424,664 B1 | 7/2002 | Oh et al. |
| 7,024,069 B2 | 4/2006 | Savchenkov et al. |
| 7,065,276 B2 | 6/2006 | Scheuer et al. |
| 7,184,624 B1 | 2/2007 | Matsko et al. |
| 7,272,160 B1 | 9/2007 | Geng et al. |
| 7,372,574 B2 | 5/2008 | Sanders et al. |
| 7,463,360 B2 | 12/2008 | Hughes et al. |
| 8,289,616 B1 | 10/2012 | Maleki et al. |
| 8,659,760 B2 | 2/2014 | Sanders et al. |
| 8,718,112 B2 | 5/2014 | Mahrt et al. |
| 8,830,478 B2 | 9/2014 | Wu et al. |
| 9,537,283 B2 | 1/2017 | Strandjord et al. |
| 9,581,448 B2 | 2/2017 | Christensen et al. |
| 2009/0220228 A1* | 9/2009 | Popovic ............ G02B 6/29353 398/48 |
| 2010/0322559 A1 | 12/2010 | Ogawa et al. |
| 2010/0329680 A1 | 12/2010 | Presi et al. |
| 2011/0122417 A1 | 5/2011 | Molin et al. |
| 2011/0134940 A1 | 6/2011 | Hartog |
| 2011/0255094 A1 | 10/2011 | Mohageg et al. |
| 2012/0189025 A1 | 7/2012 | Zheng et al. |
| 2014/0152994 A1 | 6/2014 | Wu et al. |
| 2014/0269789 A1 | 9/2014 | Westbrook et al. |
| 2016/0204571 A1 | 7/2016 | Wu et al. |
| 2017/0067743 A1 | 3/2017 | Salit et al. |
| 2017/0241784 A1 | 8/2017 | Salit et al. |
| 2018/0081112 A1 | 3/2018 | Puckett et al. |
| 2018/0081113 A1 | 3/2018 | Puckett et al. |
| 2018/0081205 A1 | 3/2018 | Puckett |
| 2018/0358772 A1 | 12/2018 | Puckett |

FOREIGN PATENT DOCUMENTS

| | | |
|---|---|---|
| WO | 2010009951 A1 | 1/2010 |
| WO | 2015191124 | 12/2015 |

OTHER PUBLICATIONS

Campanella et al., "Integrated Optics Bragg Grating Ring Resonators With Q-Factor on Gigascale", "arXiv:1307.2413 [physics.optics]", Jul. 2013, pp. 1-4.

Campanella, C. E., F. De Leonardis, and V.M. N. Passaro., "Fiber Bragg grating ring resonators under rotation for angular velocity sensing", Applied optics 54.15 (2015): 4789-4796.

Chen, Shiyi, "Stimulated Brillouin Scattering in an On-Chip Microdisk Resonator—Abstract", Dec. 2014, Publisher: University of Illinois at Urbana-Champaign.

De Leonardis et al., "Performance of SOI Bragg Grating Ring Resonator for Nonlinear Sending Applications", "Sensors", 2014, pp. 16017-16034, vol. 14, Publisher: MDPI.

Feng et al., "Tunable Microwave Generation Based on a Brillouin Fiber Ring Laser and Reflected Pump", "Optics & Laser Technology", Jan. 26, 2011, pp. 1355-1357, No. 43, Publisher: Elsevier.

Hitz, "Silicon Raman Laser Cascades Toward Mid-IR Spectral Region", "Nature Photonics", Mar. 2008, pp. 170-174.

Kim et al., "Non-reciprocal Brillouin Scattering Induced Transparency", "Nature Physics", Jan. 26, 2015, pp. 275-280, vol. 11.

Lecoeuche et al., "Bragg Grating Based Brillouin Fibre Laser", "Optics Communications 177 (2000)", Apr. 15, 2000, pp. 303-306, Publisher: Elsevier.

Li et al., "Microresonator Brillouin Gyroscope", "Optical Society of America", 2015, pp. 1-2, Publisher: https://www.osapublishing.org/abstract.cfm?URI=nlo-2015-NTh3A.2.

Li et al., "Multiplication of a Multichannel Notch FIlter Based on a Phase-Shifted Phase-Only Sampled Fiber Bragg Grating", IEEE Photonics Technology Letters, Jul. 1, 2009, pp. 926-928, vol. 21, No. 13, IEEE.

Matsko et al., "Optical resonators with whispering gallery modes I: Basics", "IEEE JSTQE", Jan.-Feb. 2006, pp. 3-14, vol. 12, No. 1.

Nicati et al., "Frequency Pulling in a Brillouin Fiber Ring Laser", "IEEE Photonics Technology Letters", Jul. 1994, pp. 801-803, vol. 6, No. 7, Publisher: IEEE.

Nicati et al., "Frequency Stability of a Brillouin Fiber Ring Laser", "Journal of Lightwave Technology", Jul. 1, 1995, pp. 1445-1451, vol. 13, No. 7, Published in: US.

Pant et al., "On-chip Stimulated Brillouin Scattering for Microwave Signal Processing and Generation", "Laser & Photonics Reviews", 2014, pp. 653-666, vol. 8, No. 5.

Pant et al., "On-Chip Stimulated Brillouin Scattering", "Optics Express", Apr. 25, 2011, pp. 8285-8290, vol. 19, No. 9.

Shen et al., "Microwave/Millimeter/Wave Generation Using Multi-Wavelength Photonic Crystal Fiber Brillouin Laser", "Progress in Electromagnetic Research", 2008, pp. 307-320, vol. 80, Publisher: PIER.

Shi et al., "Bias of a Resonator Fiber Optic Gyro Composed of a Polarization-Maintaining Fiber Ring Resonator With the Photoinducedbirefringent Grating", Journal of Lightwave Technology, vol. 13, No. 9, Sep. 1, 1995, pp. 1853-1857.

Slagmolen, "Phase-Sensitive Reflection Technique for Characterization of a Fabry-Perot Interferometer", "Applied Optics", Jul. 20, 2000, pp. 3638-3643, vol. 39, No. 21, Publisher: Optical Society of America.

Takesue et al., "An On-Chip Coupled Resonator Optical Waveguide Single-Photon Buffer", "Nature Communications", Nov. 12, 2013, pp. 1-11.

Yariv, "Critical Coupling and Its Control in Optical Waveguide-Ring Resonator Systems", "IEEE Photonics Technology Letters, Apr. 2002", pp. 483-485, vol. 14, No. 4.

Zarinetchi et al., "Stimulated Brillouin fiber-optic laser gyroscope", "Optics Letters", Feb. 15, 1991, pp. 229-231, vol. 16, No. 4, Publisher: Optical Society of America, Published in: New York, NY.

* cited by examiner

SYSTEMS AND METHODS FOR REDUCTION OF OPTICAL SIGNAL LINE WIDTH

U.S. GOVERNMENT LICENSE RIGHTS

This invention was made with Government support under Government Contract No. N66001-16-C-4017 awarded by SPAWAR Systems Center Pacific. The Government has certain rights in the invention.

BACKGROUND

Stimulated Brillouin scattering is used to generate signals with low phase noise. Stimulated Brillouin scattering in a ring resonator coupled to an output of a laser are used to generate a first Stokes signal, having a narrow sub-Hertz linewidth, in the ring resonator. However, this technique requires a relatively high threshold power for the optical pump, e.g. tens to hundreds of milliwatts. Stokes signals arise due to stimulated Brillouin scattering in the ring resonator. By their geometry, ring resonators are relatively large having a resonance length of about 100 mm. Further, ring resonators require complex filtering techniques to suppress unwanted higher order Stokes signals which can increase linewidth and reduces first Stokes signal power level.

SUMMARY

A method of operation of coupled Bragg resonators is provided. The method comprises providing a pump signal to the coupled Bragg resonators; generating, in the coupled Bragg resonator, a first Stokes signal at a frequency in a second resonance pass band; and suppressing second and higher order Stokes signals in the coupled Bragg resonators.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the present invention. The following detailed description is, therefore, not to be taken in a limiting sense.

Three embodiments of coupled Bragg resonators (or coupled Bragg resonators) where each Bragg resonator has at least one $\pi$ (or 180 degree) phase shift in each Bragg grating. In a first embodiment, two Bragg resonators are coupled in series by a Bragg transmission line having Bragg gratings. Bragg gratings of the first Bragg resonator, second Bragg resonator, and Bragg transmission line undergo a $\pi$ phase shift substantially where the first Bragg resonator connects to the Bragg transmission line and where the second Bragg resonator connects to the Bragg transmission line. In a second embodiment, two Bragg resonators are coupled in parallel and Bragg gratings of the first Bragg resonator and the second Bragg resonator undergo a $\pi$ phase substantially at the center of such Bragg gratings. In a third embodiment, two Bragg resonators are coupled by superposition by being superimposed upon one another, and the $\pi$ phase shift is located substantially in the center of each superimposed Bragg grating.

In the first and second embodiments, there are two separate resonators with two $\pi$ phase shifts. In the third embodiment, the superimposed resonators appear to have only one $\pi$ phase shift because the $\pi$ phase shift of each resonator is superimposed upon one another. The series coupled Bragg resonators of the first embodiment and the superimposed coupled Bragg resonators of the second embodiment have two ports, and may be collectively or individually referred to as two port resonators. The parallel coupled Bragg resonators have four ports and may be referred to also as four port resonators.

In the first and second embodiments, the coupled Bragg resonators have two $\pi$ (or 180 degree) phase shifts in their Bragg gratings which create two high Q resonances in a single stop band. Resonance as used herein are pass band resonances which pass signals in the pass band of the resonance. As the spatial separation of the two $\pi$ (or 180 degree) phase shifts is decreased, the frequency separation of the pass band resonances increases. In the third embodiment, the superimposed Bragg resonators and the superimposed $\pi$ phase shifts create two separate stop bands each of which has a high Q resonance at a center frequency of the corresponding stop band arising due to the $\pi$ phase shift. As Q is increased, the line width of the first Stokes signal is decreased.

For each embodiment, the center frequency of a stop band can be selected based upon adjusting a period of the corresponding Bragg gratings. The bandwidth of a stop band can be adjusted by adjusting grating strength of the corresponding Bragg gratings. Grating strength can be adjusted by adjusting, e.g. increasing or decreasing, the amplitude of the sidewall modulation that produces the grating.

For the first and second embodiments, by selecting an appropriate spatial separation between the two π phase shifts, the Bragg grating period, and an effective refractive index of the Bragg grating, each of the resonances in the stop band can be designed to occur at desired frequencies. For all embodiments of the coupled Bragg resonators, the desired resonances, e.g., can be designed to occur at a frequency of a pump signal emitted by a laser and at a first Stokes frequency generated in the coupled Bragg resonators. Optionally, for some materials, such as silicon based optical waveguides, the pump signal frequency is 10.9 GHz above the first Stokes frequency.

In the first and second embodiments, the stop band is designed to be sufficiently broad to cover the frequency of a second Stokes signal. In the third embodiment, at least one of the stop bands is designed to be sufficiently broad to cover the frequency of the second Stokes signal. Because there is no resonance at a frequency of the second Stokes signal, the coupled Bragg resonators inherently suppress the second Stokes signal and higher order Stokes signals without a need for additional filtering.

In comparison to ring resonators, coupled Bragg resonators consume about 100,000 times less area. The effective volume of the resonance field is also correspondingly smaller.[1] As a result, the threshold pump power, from a laser, to generate the first Stokes signal is significantly lower than for a ring resonator, e.g. hundreds of microwatts to less than ten milliwatts. The coupled Bragg resonators also have the benefit that they consume less area, and thus volume, in comparison to a ring resonator.

[1] The effective volume of coupled Bragg resonators is its effective length ($L_{eff}$) multiplied by an effective cross-sectional mode area of the coupled Bragg resonators. The effective volume of a ring resonator is 2π multiplied by the radius of the ring resonator (R) multiplied by an effective cross-sectional mode area of the ring resonator.

Figure 1A:
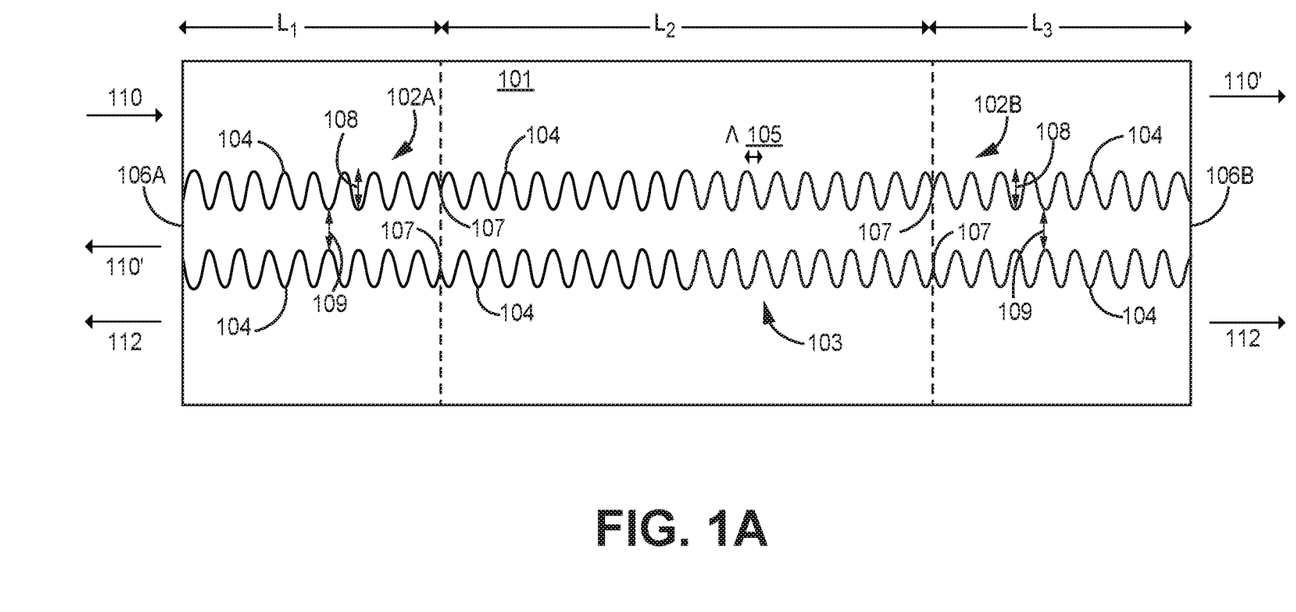
FIG. 1A illustrates a plan view of one embodiment of series coupled Bragg resonators.

FIG. 1A illustrates a plan view of one embodiment of series coupled Bragg resonators 100. For pedagogical purposes, the series coupled Bragg resonators 100 illustrated herein are implemented with planar optical waveguides, e.g. formed with silicon nitride core and silicon dioxide cladding. However, other embodiments of coupled Bragg resonators may be implemented with other types of optical waveguides such as with optical fiber.

The series coupled Bragg resonators 100 comprises a first Bragg resonator 102A coupled in series with a second Bragg resonator 102B. In the illustrated embodiment, each Bragg resonator is formed from an optical transmission line comprising cladding and a core, and at least the core of each Bragg resonator comprises Bragg gratings 104. The first Bragg resonator 102A and the second Bragg resonator 102A are connected by a Bragg transmission line 103. The Bragg transmission line 103 is formed from an optical transmission line comprising cladding and a core, and at least the core of the optical transmission line comprises Bragg gratings 104. The Bragg transmission line 103 has a Bragg grating period that is equal to the Bragg grating period of the first Bragg resonator 102A and the second Bragg resonator 102B.

The series coupled Bragg resonators 100 is a two port device including a first port 106A and a second port 106B. Each of the first Bragg resonator 102A, the second Bragg resonator 102A, and the Bragg transmission line 103 are two port devices. A port of the first Bragg resonator 102A is connected to a first port of the Bragg transmission line 103. As port of the second Bragg resonator 102B is connected to a second port of the Bragg transmission line. 7C phase shifts in Bragg gratings occur substantially at such connections so as to generate the shifts generate a first resonance and a second resonance in a stop band.

Figure 1B:
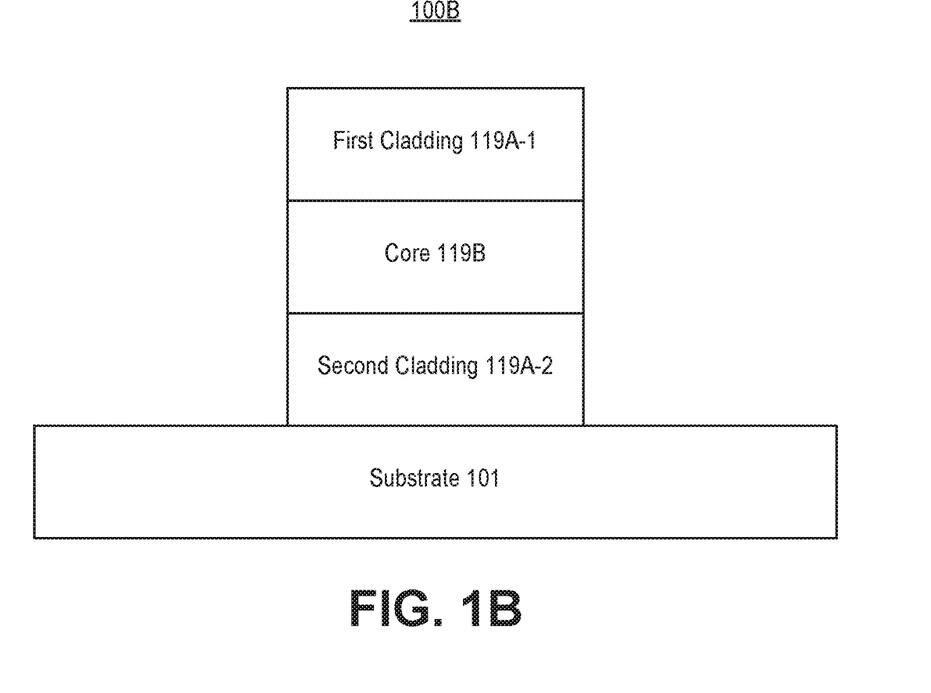
FIG. 1B illustrates a cross-sectional view of one embodiment of planar optical waveguide.

FIG. 1B illustrates a cross-sectional view of one embodiment of planar optical waveguide 100B. This embodiment of planar optical waveguide 100B may be used to implement embodiments of the invention, such as the resonators and Bragg transmission line; however, other embodiments of planar optical waveguide may be used in the alternative. The illustrated planar optical waveguide 100B comprises first cladding 109A-1, a core 109B, a second cladding 109A-2, and a substrate 101. The substrate 101 may be a semiconductor—such as silicon for example—or an insulator. The second cladding 109A-2 is disposed on the substrate 101. The core 109B is disposed on the second cladding 109A-2. The first cladding is disposed on the core 109B. The core 109B and cladding 109A-1, 109A-2 may be respectively, e.g. silicon nitride and silicon oxide. The core 109B has a higher index of refraction than the cladding 109A-1, 109A-2 so that optical energy is substantially confined to the core 109B.

Returning to FIG. 1A, the Bragg grating 104 creates a periodic variation in a refractive index of the core. The Bragg gratings undergo a π (or 180 degree) phase shift 107 in each Bragg grating where the first Bragg resonator 102A is connected to the Bragg transmission line 103, and where the second Bragg grating 102B is connected to the connected to the Bragg transmission line 103.

Each of the first Bragg resonator 102A, the second Bragg resonator 102B, and the Bragg transmission line 103 have substantially the same Bragg grating period (Λ) 105. This creates a band stop filter having a transmission stop band with a center wavelength, $\lambda_B$, of $2*n_e*\Lambda$, where $n_e$ is the effective refractive index of the Bragg grating in a core based upon the weighted indices of refraction of the core and cladding. The effective refractive index of the Bragg grating in the core quantifies a velocity of propagating light as compared to its velocity in a vacuum. $n_e$ depends upon wavelength of light, and mode(s) in which the light propagates.

The wavelength bandwidth of the stop band, $\Delta\lambda$, is $((2*\delta*n_0*\eta)/\pi)*\lambda_B$ when grating length, $N*\Lambda$, is large compared to $\lambda_B/(\delta*n_0)$. $\eta$ is a fraction of optical power in the core of the Bragg resonator. The grating length is the sum of a grating length $L_1$ of the first Bragg resonator 102A, a grating length $L_2$ of the second Bragg resonator 102B, and a grating length $L_3$ of the Bragg transmission line 103. $\delta*n_0$ is a difference in refractive index in the core arising from the Bragg gratings, i.e. the difference between the refractive indices of the cladding and the core.

Each of the two π phase shifts in the Bragg grating 104 of the coupled Bragg resonators creates a single resonance, or narrow or high Q pass band, in the transmission stop band. The two π phase shifts of the coupled Bragg resonator creates two resonances, or narrow or high Q pass bands, in the transmission stop band, if a spatial distance between the two π phase shifts is sufficiently small. Frequency separation between the two resonances, d, can be increased by reducing the spatial separation, e.g. $L_3$, of the two π phase shifts. The frequency separating the two resonances, $\Delta f$, is $k_1*e^{(k_2*d)/L_{eff}}$ when d>0 and where $k_1$ and $k_2$ are constants. Thus, by selecting $\lambda_B$ and an appropriate spatial distance $L_3$ between the two π phase shifts, the coupled Bragg resonators can be designed having a narrow or high Q pass bands at the pump frequency of a laser and at the first Stokes frequency. Optionally, high Q means a Q value greater than 20,000; however, alternatively the Q values can be higher or lower than 20,000.

To attain high Q (and high Finesse) in the coupled Bragg resonator, the optical pump signal from the laser is weakly coupled to the coupled Bragg resonators 100. Such weak coupling is determined by the grating strength and the length of each of the first Bragg resonator and the second Bragg resonator. For pedagogical purposes, grating strength is illustrated to be uniform for the first Bragg resonator 102A, the second Bragg resonator 102B, and the Bragg transmission line 103. Optionally, grating strength may varying amongst the first Bragg resonator 102A, the second Bragg resonator 102B, and the Bragg transmission line 103, or even within one or more of such components. Grating strength is a function of modulation depth 108 which can vary by Bragg grating, e.g. due to the application of apodization. However, for pedagogical reasons, the Bragg gratings 104 illustrated herein have the same modulation depth. The Bragg grating has a minimum width 109, and a maximum width that is the sum of the minimum width 109 and the modulation depth 108. The minimum width 108 and the maximum width are respectively the minimum and maximum distances between surfaces of the Bragg gratings. For the coupled series Bragg resonators 100, the Bragg transmission line 103 need not have the same grating strength as the first Bragg resonator 102 and the second Bragg resonator 102B.

Weak coupling is achieved by increasing the reflectivity, e.g. to be greater than or equal to 99% at the first port 106A and the second port 106B of the coupled Bragg resonators 100. Reflectivity, R, is $\tan h^2(\kappa^* L)$, where $\kappa$ is grating strength ($\delta^* n_0^* \eta$) and L is either $L_1 + L_3$ (with respect to reflectivity at the first port 106A) or $L_3 + L_2$ (with respect to reflectivity at the second port 106B). Reflectivity at the first port 106A can be increased by increasing the grating length $L_1$ of the first Bragg resonator 102A and the grating length $L_2$ of the second Bragg resonator 102B, and/or increasing the modulation depth 108 of the Bragg gratings 104. Optionally, each of $L_1$ and $L_2$ must be at least one hundred grating periods in length.

The electromagnetic fields of both resonances occupy a substantially similar area of the coupled Bragg resonators. Amplitude peaks of the electromagnetic fields occur at each of the 7C phase shifts.

Figure 1C:
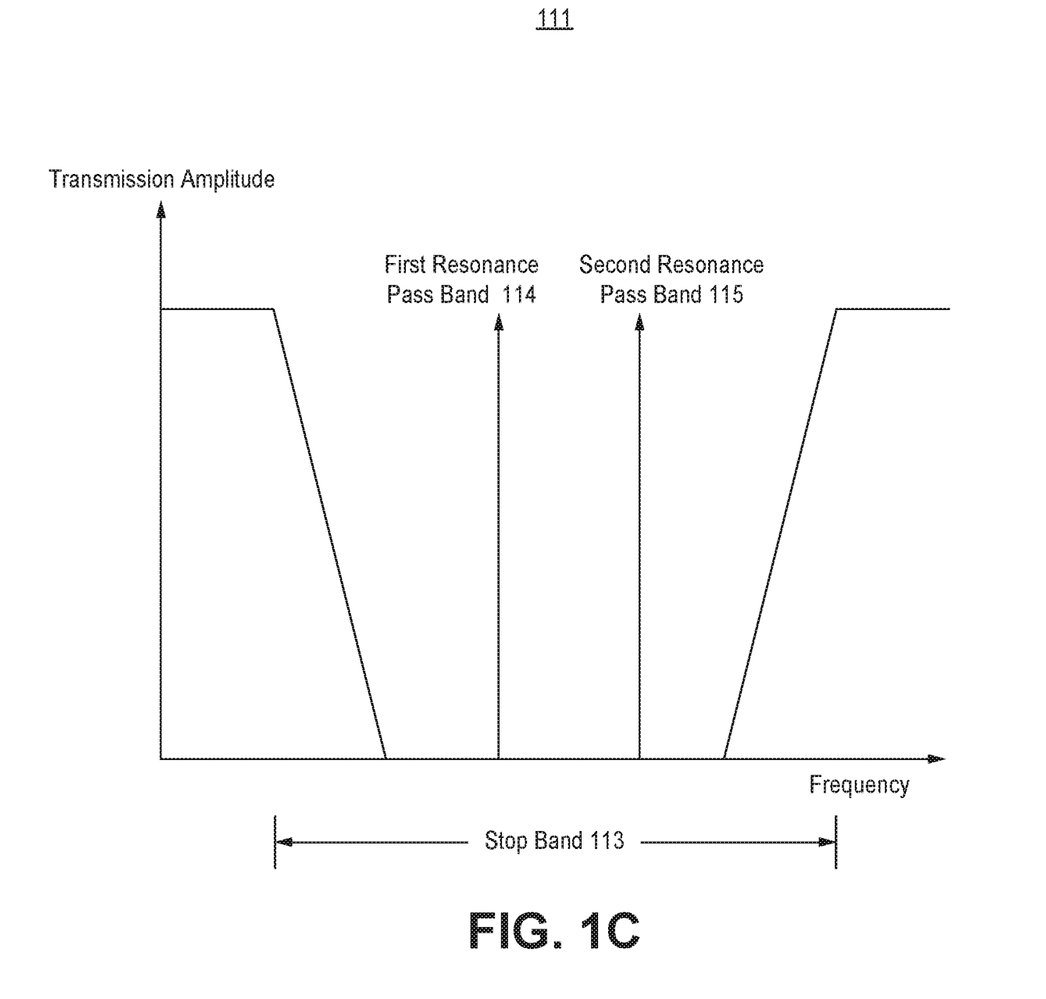
FIG. 1C illustrates an exemplary transmission amplitude frequency response.

FIG. 1C illustrates an exemplary transmission amplitude frequency response (frequency response) 111 for the first and second embodiments of the coupled Bragg resonators described herein. The frequency response comprises a stop band 113. In the stop band 113 are a first resonance pass band 114, e.g. including a frequency of a first Stokes signal, and a second resonance pass band 115, e.g. including a frequency of a pump signal.

The series coupled Bragg resonators illustrated in FIG. 1A may be practically implemented in a system as subsequently illustrated. For the embodiment of FIG. 1A, an optical pump signal 110, e.g. from a laser, may be coupled to the first port 106A of the series coupled Bragg resonators 100. Then substantially one half of the power of the pump signal 110' is emitted from each of the first port 106A and the second port 106B. Further, substantially one half of the power of the first Stokes signal 112 is emitted from each of the first port 106A and the second port 106B.

Figure 1D:
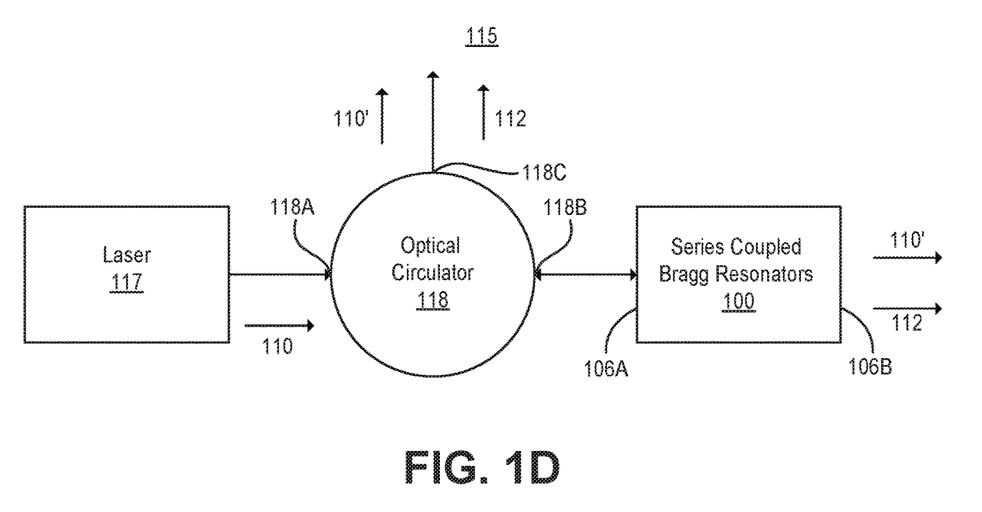
FIG. 1D illustrates a diagram of one embodiment of an optical system configured to generate a low phase noise signal with stimulated Brillouin scattering using two port coupled Bragg resonators.

FIG. 1D illustrates a diagram of one embodiment of an optical system 115 configured to generate a low phase noise signal with stimulated Brillouin scattering using two port coupled Bragg resonators. The optical system 115 configured to generate a low phase noise signal with stimulated Brillouin scattering comprises an optical circulator 118 coupled between a laser 117 and series coupled Bragg resonators 100. The optical circulator 118 has a first port 118A, a second port 118B, and a third port 118C. The optical circulator has high isolation between signals propagating from: (a) the first port 118A to the third port 118C, from the second port 118B to the first port 118A, and from the third port 118C to the second port 118B. The optical circulator has low insertion loss between signals propagating from: (a) the first port 118A to the second port 118B, from the second port 118B to the third port 118C, and from the third port 118C to the first port 118A. The optical circulator 118C isolates the laser 117 from the pump signal 110' and the first Stokes signal 112 emitted at the first port of the series coupled Bragg resonators 100. If such pump signal 110' and the first Stokes signal 112 were injected into the laser 117, then the pump signal 110 emitted by the laser 117 would become distorted. A distorted pump signal could result in an undesirably distorted first Stokes signal. Note, the two port coupled Bragg resonators may be implemented in other optical system designs.

For the optical system 115 of FIG. 1C, both the pump signal and the first Stokes signal emanate from the third port 118c of the optical circulator 118. However, the embodiment illustrated by FIG. 1C has a first problem: additional filtering, coupled to the third port 118C (or the second port 106B), is required to separate the first Stokes signal 112 from the pump signal 110'.

The second port 106B of the series coupled Bragg resonators 100 may be unterminated or optionally terminated with a non-reflective termination, e.g. a grating coupler, a cleave in the optical waveguide (and possibly the substrate on which a planar optical waveguide is formed or mounted), or a taper of the optical waveguide to zero width or diameter. The lack of termination or non-reflective termination allows the pump signal 110' and the first Stokes signal 112 exiting the second port 106B to be dissipated.

Note, alternatively, the third port 118C of the optical circulator 118 can be left unterminated or terminated by a non-reflective termination. In such a case, the optical circulator 118 acts as an optical isolator. Further, the pump signal 110' and the first Stokes signal would be extracted from the second port 106B of the coupled Bragg resonators 100.

However, the embodiment illustrated by FIG. 1C has a first problem: only one half of the generated Stokes signal is obtained from the optical system 115. Thus, the optical system 115 has diminished efficiency because about one half of the power of the first Stokes signal is dissipated.

Figure 2A:
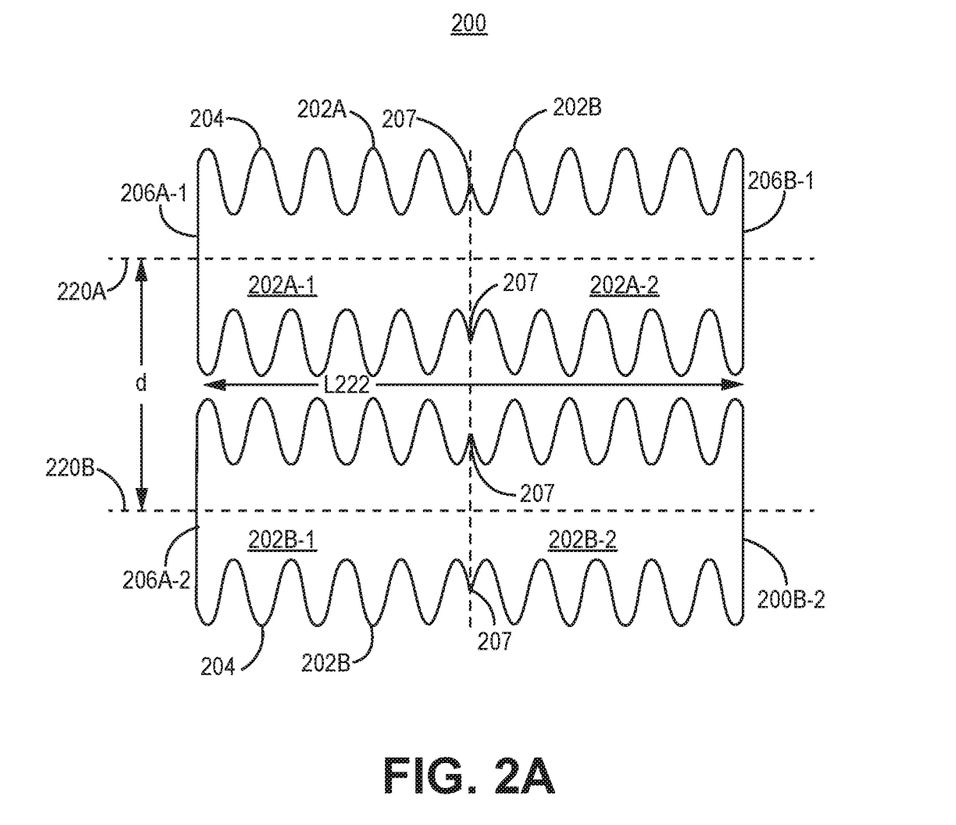
FIG. 2A illustrates a plan view of one embodiment of parallel coupled Bragg resonators.

FIG. 2A illustrates a plan view of one embodiment of parallel coupled Bragg resonators 200. Each Bragg resonator 202A, 202B of the parallel coupled Bragg resonators 200 may be implemented, e.g. using planar optical waveguide or fiber, as described above for the Bragg resonators 102A, 102B illustrated in FIG. 1A. The parallel coupled Bragg resonators 200 of FIG. 2A comprises a first Bragg resonator 202A that is in parallel with a second Bragg resonator 202A. The parallel coupled Bragg resonators 200 is a four port device, comprising a first port 206A-1, a second port 206B-1, a third port 206A-2, and a fourth port 206B-2. The first Bragg resonator 202 comprises the first port 206A-1 and the second port 206A-2. The second Bragg resonator 202 comprises the third port 206B-1 and the fourth port 206B-2.

The first Bragg resonator 202A and the second Bragg resonator 202B of FIG. 2A comprise Bragg gratings 204 having a 7C phase shifts 207 substantially at the center of respectively a first centerline 220A and a second centerline 220B. At least a portion of the first centerline 220A and the second centerline 220B are parallel where Bragg gratings of each Bragg resonator 202A, 202B undergoes a π phase shift.

A center frequency of a first resonance and a center frequency of a second resonance are dependent upon a distance between the centerlines 220A, 220B where the 7C phase shifts 207 occur and thus where the first centerline 220A and the second centerline 220B are parallel.

Frequency separation of the first and second resonance frequencies 114, 115 in the stop band 113 is dependent upon an effective separation distance (den). The effective separation distance is:

$$\frac{\int (E*d)dx}{\int (E)dx} \qquad \text{(Equation 1)}$$

where E is a resonance field for both resonances and d is the distance between the $\pi$ phase shift 207 of each Bragg resonator 202A, 202B. In the case where the lengths of each Bragg resonator 202A, 202B are the same, L 222, such integration is performed over this length L of both Bragg resonators 202A, 202B. In FIG. 2, d is illustrated as the distance between a first centerline (or first center axis) 220A of the first Bragg resonator 202A and a second centerline (or second center axis) 220B of the second Bragg resonator 202B. Thus, the frequencies of the resonances may be determined by selecting the center frequency and bandwidth of the band stop filter as described above, and selecting frequency separation of the resonances by selecting d and the lengths of the Bragg resonators 202A, 202B.

Because the resonance field declines exponentially as the distance from the $\pi$ phase shift 207 increases, a first portion 202A-1 and a second portion 202A-2 of the first Bragg resonator 202A need not be proximate respectively to a first portion 202B-1 and a second portion 202B-2 of the second Bragg resonator 202B. Only the $\pi$ phase shifts 207 need be proximate. Thus, in other embodiments, the distance between the first portion 202A-1 and the second portion 202A-2 of the first Bragg resonator 202A and respectively to the first portion 202B-1 and the second portion 202B-2 of the second Bragg resonator 202B may be increased, e.g. by increasing the distance by taper in each of the parallel edges of the first portion 202A-1 and the second portion 202A-2 of the first Bragg resonator 202A and respectively to the first portion 202B-1 and the second portion 202B-2 of the second Bragg resonator 202B.

Figure 2B:
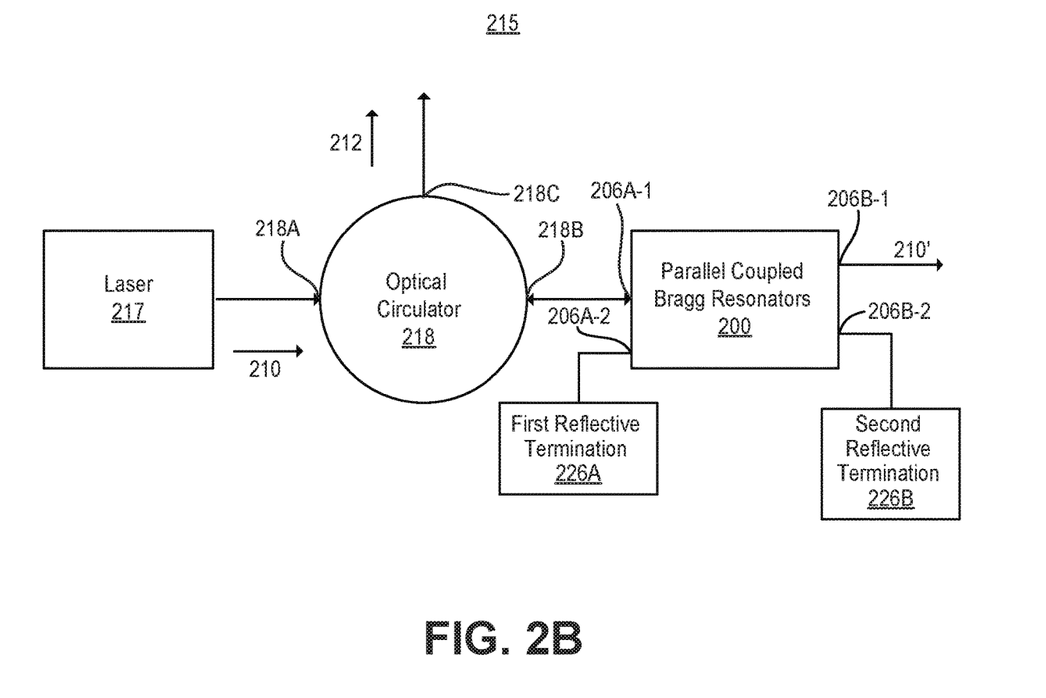
FIG. 2B illustrates a diagram of one embodiment of an optical system 215 configured to generate a low phase noise signal with stimulated Brillouin scattering using parallel coupled Bragg resonators.

FIG. 2B illustrates a diagram of one embodiment of an optical system 215 configured to generate a low phase noise signal with stimulated Brillouin scattering using parallel coupled Bragg resonators. A laser 217 is coupled through an optical circulator to the parallel coupled Bragg resonators 200. The laser emits a pump signal 210.

The optical circulator 218 has a first port 218A, a second port 218B, and a third port 218C. The first port 218A of the optical circulator 218 is coupled to the laser 217. The second port 218B of the optical circulator is coupled to a first port 206A-1 of the parallel coupled Bragg resonators 200. The third port 218C of the optical circulator 218 is configured to emit the first Stokes signal.

The third port 206A-2 of the parallel coupled Bragg resonators 200 are coupled to a first reflective termination 226A, e.g. a reflective coating at the end of an optical fiber or and an optical waveguide with Bragg gratings. The fourth port 20B-2 of the parallel coupled Bragg resonators 200 are coupled to a second reflective termination 226A, e.g. a reflective coating at the end of an optical fiber or and an optical waveguide with Bragg gratings. The second port 206B-1 of the parallel coupled Bragg resonators 200 may be unterminated or optionally terminated with a non-reflective termination, e.g. a grating coupler, a cleave in the optical waveguide (and possibly the substrate on which a planar optical waveguide is formed or mounted), or a taper of the optical waveguide to zero width or diameter. The lack of termination or non-reflective termination allows the pump signal 210' exiting the second port 206B-1 to be dissipated. Note, the four port coupled Bragg resonators may be implemented in other optical system designs.

Figure 3A:
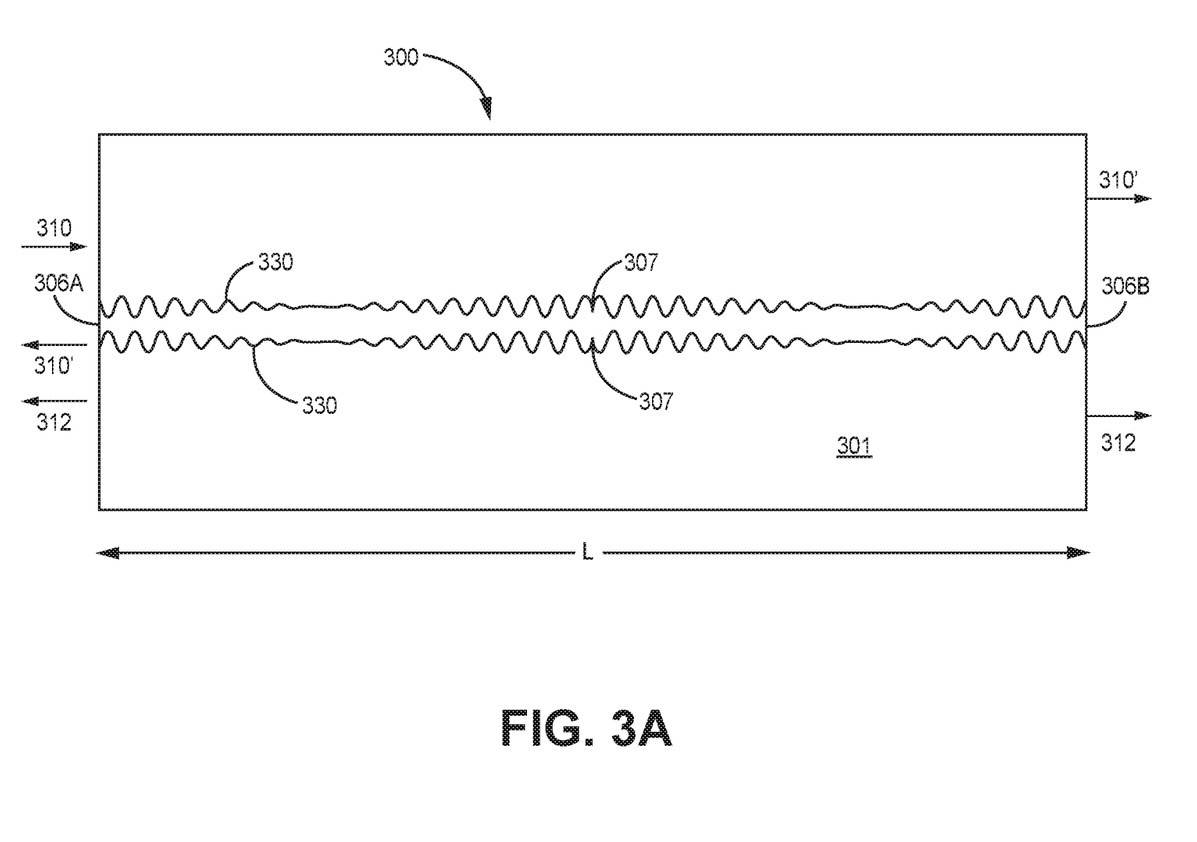
FIG. 3A illustrates a plan view of one embodiment of a superimposed coupled resonator.

FIG. 3A illustrates a plan view of one embodiment of a superimposed coupled resonator 300. The superimposed coupled resonator 300 comprises two Bragg resonators having the same length L, different Bragg grating periods, and a $\pi$ phase shift substantially at the center of each Bragg resonator (or L/2 from each of the first port 306A and second port 306B along a longitudinal axis between such ports). The Bragg gratings of one Bragg resonator is superimposed over the Bragg gratings of the other Bragg resonator. The grating strength, e.g. the modulation depth) of each of the two Bragg resonators may be the same or different. The superimposed coupled resonator 300 has superimposed Bragg grating 330 with a variable Brag grating period and a variable grating strength, e.g. modulation depth. The superimposed coupled resonator 300 may be formed in a manner similar to the series coupled Bragg resonators 100, e.g. on a substrate 301.

The superimposed coupled Bragg resonators 300 illustrated in FIG. 3A may be practically implemented, for example in a system as illustrated in FIG. 1D. For the embodiment of FIG. 3A, an optical pump signal 310, e.g. from a laser, may be coupled to the first port 306A of the superimposed coupled Bragg resonators 300. Then substantially one half of the power of the pump signal 310' is emitted from each of the first port 106A and the second port 106B. Further, substantially one half of the power of the first Stokes signal 312 is emitted from each of the first port 306A and the second port 306B.

Figure 3B:
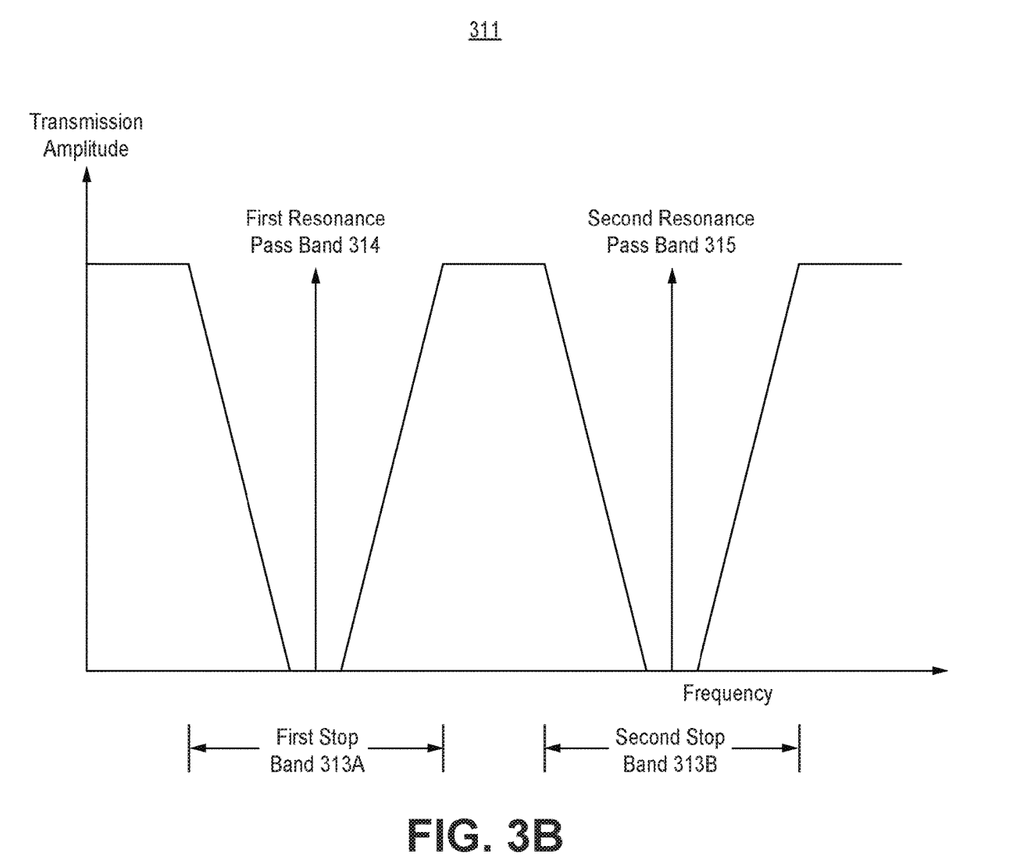
FIG. 3B illustrates another exemplary transmission amplitude frequency response.

FIG. 3B illustrates an exemplary transmission amplitude frequency response (frequency response) 311 of the third embodiments of the coupled Bragg resonators described herein. The frequency response comprises a first stop band 313A and a second stop band 313B. In the stop band 313A is a first resonance pass band 314, e.g. including a frequency of a first Stokes signal. In the second stop band 313B is a second resonance pass band 315, e.g. including a frequency of a pump signal.

Figure 4:
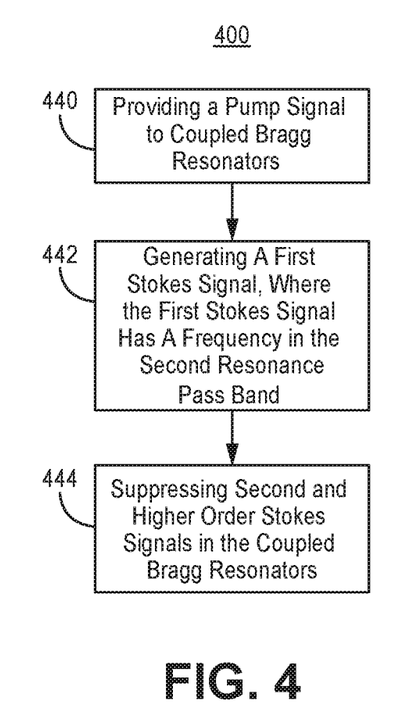
FIG. 4 illustrates an exemplary method of operation of coupled Bragg resonators.

FIG. 4 illustrates an exemplary method of operation of coupled Bragg resonators 400. To the extent the method 400 shown in FIG. 4 is described herein as being implemented in the devices shown in FIGS. 1A, 1B, 1D, 2A, 2B, and 3A, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440, provide a pump signal to coupled Bragg resonators, where each Bragg resonator of the coupled Bragg resonator has a $\pi$ phase shift in each Bragg grating of each Bragg resonator. For example, the coupled Bragg resonators may be series, parallel, or superimposed coupled Bragg resonators. For series coupled Bragg resonators, a $\pi$ phase shift is located in each Bragg grating substantially where the Bragg grating of Bragg transmission line (connecting the serially coupled Bragg resonators) connects to the Bragg grating of the corresponding Bragg resonator. In a second embodiment, two Bragg resonators are coupled in parallel and the π phase shift is located substantially in the center of each Bragg grating. In a third embodiment, two Bragg resonators are coupled by superposition by being superimposed upon one another, and the π phase shift is located substantially in the center of each superimposed Bragg grating.

The coupled Bragg resonators have only a first resonance pass band and a second resonance pass band. The pump signal has a frequency equal to a frequency in the second resonance pass band.

In block 442, generate a first Stokes signal in the coupled Bragg resonator. The first Stokes signal has a frequency in the second resonance pass band. In block 444, suppress second and higher order Stokes signals in the coupled Bragg resonators.

Terms of relative position as used in this application are defined based on a plane parallel to, or in the case of the term coplanar—the same plane as, the conventional plane or working surface of a device, layer, wafer, or substrate, regardless of orientation. The term "horizontal" or "lateral" as used in this application are defined as a plane parallel to the conventional plane or working surface of a device, layer, wafer, or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a device, layer, wafer, or substrate, regardless of orientation. The term "coplanar" as used in this application is defined as a plane in the same plane as the conventional plane or working surface of a device, layer, wafer, or substrate, regardless of orientation.

A number of examples defined by the following claims have been described. Nevertheless, it will be understood that various modifications to the described examples may be made without departing from the spirit and scope of the claimed invention. Therefore, it is manifestly intended that this invention be limited only by the claims and the equivalents thereof.

Example Embodiments

Example 1 includes an apparatus, comprising: a first Bragg resonator comprising a first set of Bragg gratings, a first port, and a second port, where the first Bragg resonator has a first length; a Bragg transmission line comprising a second set of Bragg gratings, a third port, and a fourth port, where the second port is connected to the third port, and where the Bragg transmission line has a second length; a second Bragg resonator comprising a third set of Bragg gratings, a fifth port, and a sixth port, where the fourth port is connected to the fifth port, and where the second Bragg resonator has a third length; wherein the first set, second set, and third set have the same Bragg grating period, where the Bragg grating period is configured to generate a stop band having a center frequency corresponding to the Bragg grating period; and wherein the Bragg gratings of the first set, the second set, and the third set undergo a π phase shift substantially where the second port is connected to the third port and substantially where the fourth port is connected to the fifth port, where the π phase shifts generate a first resonance pass band and a second resonance pass band in the stop band, where a center frequency of the first resonance pass band and a center frequency of the second resonance pass band are determined by the second length, where the Q factor of the first resonance pass band is determined by the first length and a grating strength of the first set, and where the Q factor of the second resonance pass band is determined by the third length and a grating strength of the third set.

Example 2 includes the apparatus of Example 1, wherein the grating strength of the first set, the grating strength of the second set, and a grating strength of the third set are equal; and wherein the first length and the second length are equal.

Example 3 includes the apparatus of Example 1, wherein the grating strength of the first set, the grating strength of the second set, and a grating strength of the third set each varies by grating.

Example 4 includes the apparatus of Example 1, wherein the first port is configured to receive a pump signal having a pump frequency and having a power level exceeding a threshold level, where only a first Stokes signal is configured to be generated in the first Bragg resonator, the Bragg transmission line, and the second Bragg resonator; and wherein the sixth port is configured to emit only the pump signal and a first Stokes signal.

Example 5 includes the apparatus of any of Examples 1-4, further comprising: a laser comprising an output and configured to emit the pump signal at the output; and an optical circulator coupled between the output and the first port.

Example 6 includes the apparatus of Example 1, wherein at least one of the first Bragg resonator, the Bragg transmission line, and the second Bragg resonator comprise a first cladding layer, a second cladding layer, and a core layer; wherein the core layer is configured to be between the first cladding layer and the second cladding layer, and comprises a Bragg grating on two opposite edges; and wherein the second cladding layer is on a substrate.

Example 7 includes an apparatus, comprising: a first Bragg resonator comprising a first set of Bragg gratings, a first port, and a second port, where the first Bragg resonator has a first length, where the first Bragg resonator comprises a first center axis through the first Bragg resonator, and where optical signals are configured to propagate in the first Bragg resonator in at least one direction of the first center axis; a second Bragg resonator comprising a second set of Bragg gratings, a third port, and a fourth port, where the second Bragg resonator has a second length, and where the second Bragg resonator comprises a second center axis through the second Bragg resonator, and where optical signals are configured to propagate in the second Bragg resonator in at least one direction of the second center axis; wherein the first set and second set have the same Bragg grating period, where the Bragg grating period is configured to generate a stop band having a center frequency corresponding to the Bragg grating period; wherein the Bragg gratings of the first set undergoes a π phase shift substantially at a center of the first center axis; wherein the Bragg gratings of the second set undergoes a π phase shift substantially at a center of the second center axis; wherein at least a portion of the first center axis and the second center axis are parallel where Bragg gratings of the first set undergoes a π phase shift and where Bragg gratings of the second set undergoes a π phase shift; wherein a first center axis of the first Bragg resonator and a second center axis of the second Bragg resonator are separated by a first distance where the first center axis and the second center axis are parallel; and wherein the 7C phase shifts generate a first resonance pass band and a second resonance pass band in the stop band, where a center frequency of the first resonance pass band and a center frequency of the second resonance pass band are determined by the first distance, where the Q factor of the first resonance pass band is determined by the first length and a grating strength of the first set, and where the Q factor of the second resonance pass band is determined by the second length and a grating strength of the third set.

Example 8 includes the apparatus of Example 7, wherein a distance separating first center line and the second centerline increases as displacement along each centerline from a corresponding π phase shift increases.

Example 9 includes the apparatus of Example 7, wherein the grating strength of the first set and the grating strength of the second set are equal; and wherein the first length and the second length are equal.

Example 10 includes the apparatus of Example 7, wherein the grating strength of the first set and the grating strength of the second set varies by grating.

Example 11 includes the apparatus of Example 7, wherein the first port is configured to receive a pump signal having a pump frequency and having a power level exceeding a threshold level, where only a first Stokes signal is configured to be generated in the first Bragg resonator and the second Bragg resonator.

Example 12 includes the apparatus of any of Examples 7-11, further comprising: a laser comprising an output and configured to emit the pump signal at the output; an optical circulator, comprising a fifth port, a sixth port, and a seventh port, where the fifth port is coupled to the output, the sixth port is coupled to the first port, and the seventh port is configured to emit the first Stokes signal; wherein a first reflective termination is coupled to the third port; and wherein a second reflective termination is coupled to the fourth port.

Example 13 includes the apparatus of Example 7, wherein at least one of the first Bragg resonator and the second Bragg resonator comprises a first cladding layer, a second cladding layer, and a core layer; wherein the core layer is configured to be between the first cladding layer and the second cladding layer, and comprises a Bragg grating on two opposite edges; and wherein the second cladding layer is on a substrate.

Example 14 includes an apparatus, comprising: coupled Bragg resonators comprising a first set of Bragg gratings, a first port, and a second port, where the coupled Bragg resonators have a first length, where the first set of Bragg gratings is formed by a superposition of a second set of Bragg gratings having a second length and a third set of Bragg gratings having a third length; wherein the second set and third set have the different Bragg grating periods, where the Bragg grating period of the second set is configured to generate a first stop band having a first center frequency corresponding to the Bragg grating period of the second set, and where the Bragg grating period of the third set is configured to generate a second stop band having a second center frequency corresponding to the Bragg grating period of the third set; and wherein the Bragg gratings of the second set undergo a π phase shift substantially at a center of the Bragg gratings of the second set, where the Bragg gratings of the third set undergo a π phase shift substantially at a center of the Bragg gratings of the third set, where the π phase shift in the Bragg gratings of the first set generates a first resonance pass band in a center of the first stop band and a second resonance pass band in a center of the second stop band, where the Q factor of the first resonance pass band is determined by the length and a grating strength of the second set, and where the Q factor of the second resonance pass band is determined by the length and a grating strength of the third set.

Example 15 includes the apparatus of Example 14, wherein each π phase shift in the second set and each π phase shift in the third set corresponds to a single π phase shift in the first set.

Example 16 includes the apparatus of Example 14, wherein the grating strength of the second set and the grating strength of the third set are equal; and wherein the first length, and the second length, and the third length are equal.

Example 17 includes the apparatus of Example 14, wherein the grating strength of the second set and the grating strength of the third set varies by grating.

Example 18 includes the apparatus of Example 14, wherein the first port is configured to receive a pump signal having a pump frequency and having a power level exceeding a threshold level. where only a first Stokes signal is configured to be generated in the coupled Bragg resonators; and wherein the second port is configured to emit only the pump signal and a first Stokes signal.

Example 19 includes the apparatus of any of Examples 14-18, further comprising: a laser comprising an output and configured to emit the pump signal at the output; and an optical circulator coupled between the output and the first port.

Example 20 includes the apparatus of Example 14, wherein the coupled Bragg resonators comprise a first cladding layer, a second cladding layer, and a core layer; wherein the core layer is configured to be between the first cladding layer and the second cladding layer, and comprises a Bragg grating on two opposite edges; and wherein the second cladding layer is on a substrate.

In various alternative embodiments, system elements, method steps, or examples described throughout this disclosure (such as the resonator switching servo loops or the feed-forward rate processor, or sub-parts thereof, for example) may be implemented on one or more computer systems, field programmable gate array (FPGA), or similar devices comprising a processor executing code to realize those elements, processes, or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An apparatus, comprising:
a first Bragg resonator comprising a first set of Bragg gratings, a first port, and a second port, where the first Bragg resonator has a first length;
a Bragg transmission line comprising a second set of Bragg gratings, a third port, and a fourth port, where the second port is connected to the third port, and where the Bragg transmission line has a second length;
a second Bragg resonator comprising a third set of Bragg gratings, a fifth port, and a sixth port, where the fourth port is connected to the fifth port, and where the second Bragg resonator has a third length;
wherein the first set, second set, and third set have the same Bragg grating period, where the Bragg grating period is configured to generate a stop band having a center frequency corresponding to the Bragg grating period; and
wherein the Bragg gratings of the first set, the second set, and the third set undergo a $\pi$ phase shift substantially where the second port is connected to the third port and substantially where the fourth port is connected to the fifth port, where the $\pi$ phase shifts generate a first resonance pass band and a second resonance pass band in the stop band, where a center frequency of the first resonance pass band and a center frequency of the second resonance pass band are determined by the second length, where the Q factor of the first resonance pass band is determined by the first length and a grating strength of the first set, and where the Q factor of the second resonance pass band is determined by the third length and a grating strength of the third set.

2. The apparatus of claim 1, wherein the grating strength of the first set, the grating strength of the second set, and a grating strength of the third set are equal; and
wherein the first length and the second length are equal.

3. The apparatus of claim 1, wherein the grating strength of the first set, the grating strength of the second set, and a grating strength of the third set each varies by grating.

4. The apparatus of claim 1, wherein the first port is configured to receive a pump signal having a pump frequency and having a power level exceeding a threshold level, where only a first Stokes signal is configured to be generated in the first Bragg resonator, the Bragg transmission line, and the second Bragg resonator; and
wherein the sixth port is configured to emit only the pump signal and a first Stokes signal.

5. The apparatus of claim 4, further comprising:
a laser comprising an output and configured to emit the pump signal at the output; and
an optical circulator coupled between the output and the first port.

6. The apparatus of claim 1, wherein at least one of the first Bragg resonator, the Bragg transmission line, and the second Bragg resonator comprise a first cladding layer, a second cladding layer, and a core layer;
wherein the core layer is configured to be between the first cladding layer and the second cladding layer, and comprises a Bragg grating on two opposite edges; and
wherein the second cladding layer is on a substrate.

7. An apparatus, comprising:
a first Bragg resonator comprising a first set of Bragg gratings, a first port, and a second port, where the first Bragg resonator has a first length, where the first Bragg resonator comprises a first center axis through the first Bragg resonator, and where optical signals are configured to propagate in the first Bragg resonator in at least one direction of the first center axis;
a second Bragg resonator comprising a second set of Bragg gratings, a third port, and a fourth port, where the second Bragg resonator has a second length, and where the second Bragg resonator comprises a second center axis through the second Bragg resonator, and where the optical signals are configured to propagate in the second Bragg resonator in at least one direction of the second center axis;
wherein the first set and second set have the same Bragg grating period, where the Bragg grating period is configured to generate a stop band having a center frequency corresponding to the Bragg grating period;
wherein the Bragg gratings of the first set undergoes a $\pi$ phase shift substantially at a center of the first center axis;
wherein the Bragg gratings of the second set undergoes a $\pi$ phase shift substantially at a center of the second center axis;
wherein at least a portion of the first center axis and the second center axis are parallel where Bragg gratings of the first set undergoes a $\pi$ phase shift and where Bragg gratings of the second set undergoes a $\pi$ phase shift;
wherein a first center axis of the first Bragg resonator and a second center axis of the second Bragg resonator are separated by a first distance where the first center axis and the second center axis are parallel; and
wherein the $\pi$ phase shifts generate a first resonance pass band and a second resonance pass band in the stop band, where a center frequency of the first resonance pass band and a center frequency of the second resonance pass band are determined by the first distance, where the Q factor of the first resonance pass band is determined by the first length and a grating strength of the first set, and where the Q factor of the second resonance pass band is determined by the second length and a grating strength of the third set.

8. The apparatus of claim 7, wherein a distance separating first center line and the second centerline increases as displacement along each centerline from a corresponding $\pi$ phase shift increases.

9. The apparatus of claim 7, wherein the grating strength of the first set and the grating strength of the second set are equal; and
wherein the first length and the second length are equal.

10. The apparatus of claim 7, wherein the grating strength of the first set and the grating strength of the second set varies by grating.

11. The apparatus of claim 7, wherein the first port is configured to receive a pump signal having a pump frequency and having a power level exceeding a threshold level, where only a first Stokes signal is configured to be generated in the first Bragg resonator and the second Bragg resonator.

12. The apparatus of claim 11, further comprising:
a laser comprising an output and configured to emit the pump signal at the output;
an optical circulator, comprising a fifth port, a sixth port, and a seventh port, where the fifth port is coupled to the output, the sixth port is coupled to the first port, and the seventh port is configured to emit the first Stokes signal;
wherein a first reflective termination is coupled to the third port; and
wherein a second reflective termination is coupled to the fourth port.

13. The apparatus of claim 7, wherein at least one of the first Bragg resonator and the second Bragg resonator comprises a first cladding layer, a second cladding layer, and a core layer;
  wherein the core layer is configured to be between the first cladding layer and the second cladding layer, and comprises a Bragg grating on two opposite edges; and
  wherein the second cladding layer is on a substrate.

14. An apparatus, comprising:
  coupled Bragg resonators comprising a first set of Bragg gratings, a first port, and a second port, where the coupled Bragg resonators have a first length, where the first set of Bragg gratings is formed by a superposition of a second set of Bragg gratings having a second length and a third set of Bragg gratings having a third length;
  wherein the second set and third set have the different Bragg grating periods, where the Bragg grating period of the second set is configured to generate a first stop band having a first center frequency corresponding to the Bragg grating period of the second set, and where the Bragg grating period of the third set is configured to generate a second stop band having a second center frequency corresponding to the Bragg grating period of the third set; and
  wherein the Bragg gratings of the second set undergo a $\pi$ phase shift substantially at a center of the Bragg gratings of the second set, where the Bragg gratings of the third set undergo a $\pi$ phase shift substantially at a center of the Bragg gratings of the third set, where the $\pi$ phase shift in the Bragg gratings of the first set generates a first resonance pass band in a center of the first stop band and a second resonance pass band in a center of the second stop band, where the Q factor of the first resonance pass band is determined by the length and a grating strength of the second set, and where the Q factor of the second resonance pass band is determined by the length and a grating strength of the third set.

15. The apparatus of claim 14, wherein each $\pi$ phase shift in the second set and each $\pi$ phase shift in the third set corresponds to a single $\pi$ phase shift in the first set.

16. The apparatus of claim 14, wherein the grating strength of the second set and the grating strength of the third set are equal; and
  wherein the first length, and the second length, and the third length are equal.

17. The apparatus of claim 14, wherein the grating strength of the second set and the grating strength of the third set varies by grating.

18. The apparatus of claim 14, wherein the first port is configured to receive a pump signal having a pump frequency and having a power level exceeding a threshold level, where only a first Stokes signal is configured to be generated in the coupled Bragg resonators; and
  wherein the second port is configured to emit only the pump signal and a first Stokes signal.

19. The apparatus of claim 18, further comprising:
  a laser comprising an output and configured to emit the pump signal at the output; and
  an optical circulator coupled between the output and the first port.

20. The apparatus of claim 14, wherein the coupled Bragg resonators comprise a first cladding layer, a second cladding layer, and a core layer;
  wherein the core layer is configured to be between the first cladding layer and the second cladding layer, and comprises a Bragg grating on two opposite edges; and
  wherein the second cladding layer is on a substrate.

* * * * *